Figure 4:
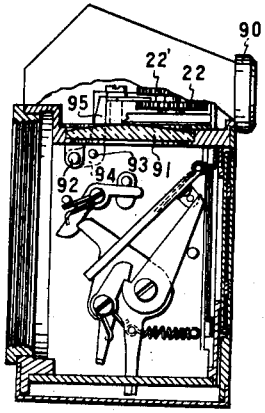

March 19, 1963
TAKESHI GOSHIMA
3,081,680
AUTOMATIC IRIS DIAPHRAGM OPERATING MECHANISMS FOR REFLEX TYPE CAMERAS
Filed July 12, 1957
3 Sheets-Sheet 1
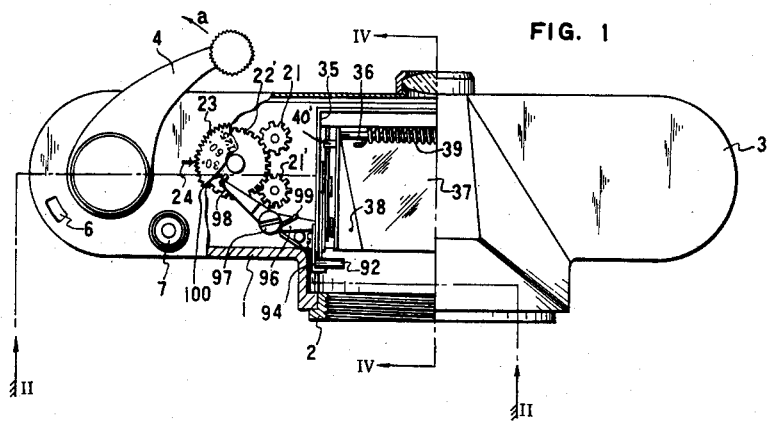
FIG. 1
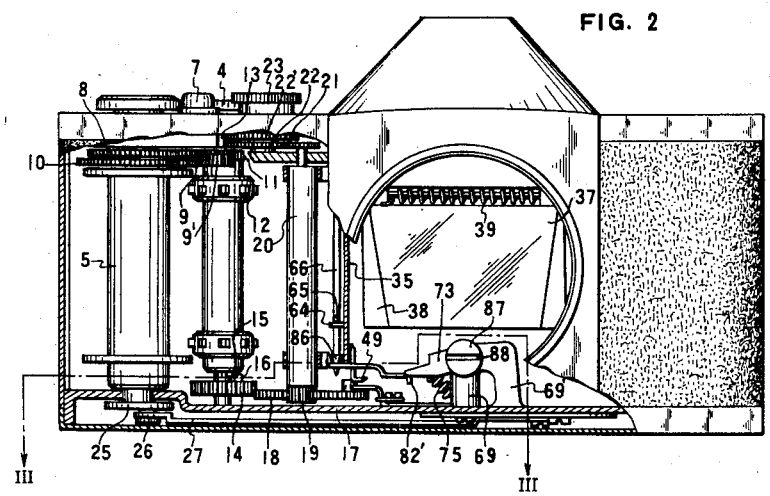
FIG. 2
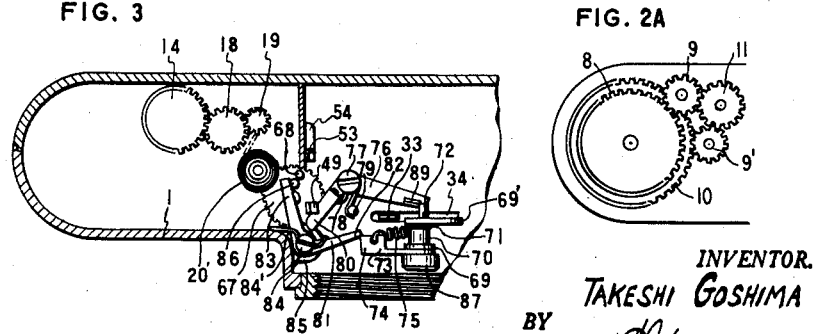
FIG. 3
FIG. 2A
INVENTOR.
TAKESHI GOSHIMA
BY
ATTORNEY March 19, 1963  TAKESHI GOSHIMA  3,081,680
AUTOMATIC IRIS DIAPHRAGM OPERATING MECHANISMS
FOR REFLEX TYPE CAMERAS Filed July 12, 1957

3 Sheets-Sheet 2

INVENTOR.
TAKESHI GOSHIMA
BY
ATTORNEY

United States Patent Office 3,081,680
Patented Mar. 19, 1963

3,081,680
AUTOMATIC IRIS DIAPHRAGM OPERATING MECHANISMS FOR REFLEX TYPE CAMERAS
Takeshi Goshima, Tokyo, Japan, assignor to Canon Camera Company, Inc., Tokyo, Japan, a corporation of Japan
Filed July 12, 1957, Ser. No. 671,520
Claims priority, application Japan July 21, 1956
5 Claims. (Cl. 95—42)

The present invention relates to a system for automatically operating iris diaphragms of photographic cameras and, more particularly, to an automatic controlling system for the iris diaphragms of single objective reflex cameras provided with preset iris diaphragms.

Iris diaphragms as usually incorporated in prior art conventional single objective reflex cameras have a diaphragm operating spring inside the tubular lens barrel, and they require the spring to be tensioned independently prior to making an exposure, and separately from the winding operation of the exposed film. Such spring tensioning is no doubt absurd and troublesome to photographers. To eliminate this disadvantage, the present invention provides an arrangement for tensioning the diaphragm operating spring simultaneously with the winding operation of the film.

Another feature of the present invention is to restore the iris diaphragm to its open position after an exposure is made so as to utilize the quick-return type reflex mirror far more efficiently than those in the prior known reflex cameras.

It is an object of the present invention to tension the actuating springs for iris diaphragms within the tubular lens barrels in coupled relation with the film winding and shutter tensioning operations, and further to maintain the preset diaphragm in its fully open position while the preparations for making an exposure are completed.

It is another object to provide separable coupling mechanisms for the preset iris diaphragm controlling system so that for each interchangeable objective a preset diaphragm can be attached to the camera.

It is a further object thereof to provide a plurality of springs in the iris diaphragm controlling system, the first spring to close the iris diaphragm down to the predetermined aperture of the diaphragm prior to operation of the shutter and the second spring to open the closed iris diaphragm to the full open position forthwith after an exposure is made.

Figure 5:
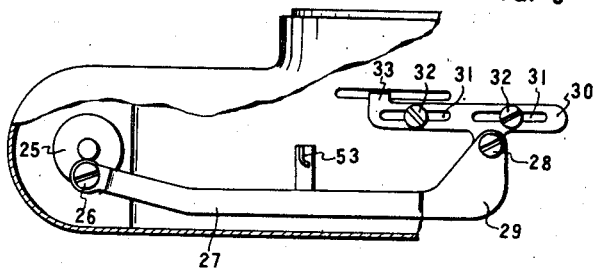
Figure 7:
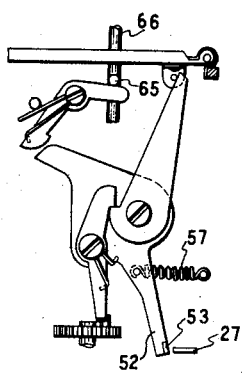
Figure 6:
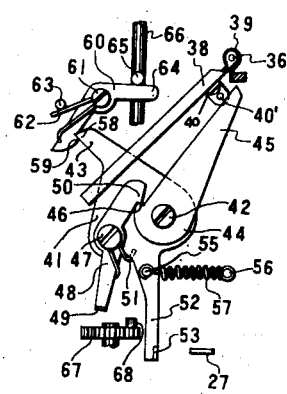
Figure 9:
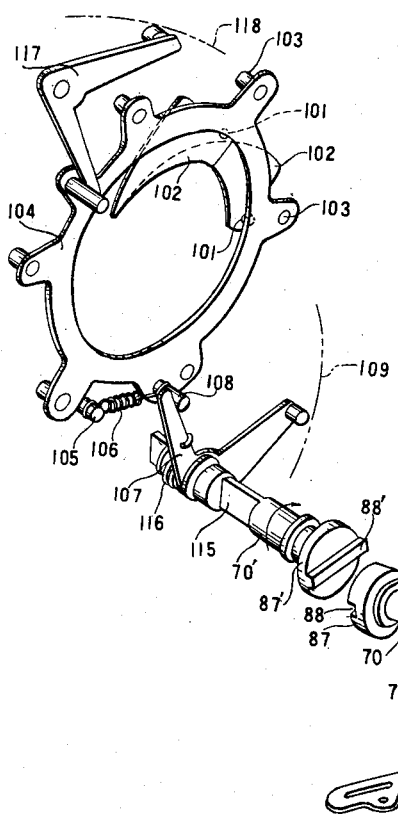
Figure 8:
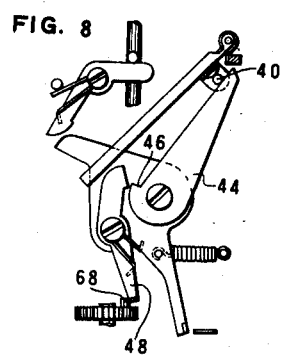
Figure 10:
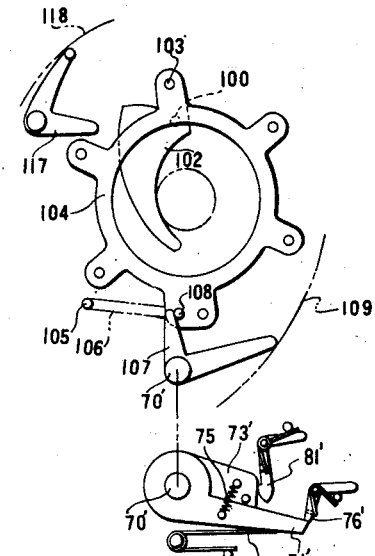
Figure 11:
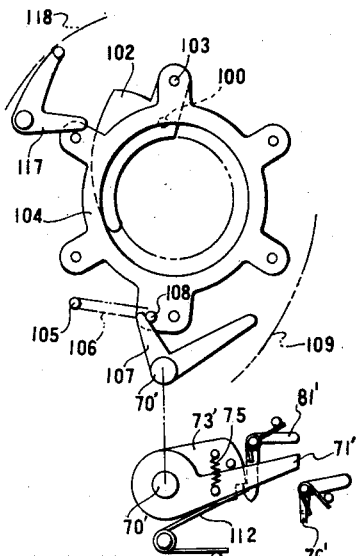
Figure 12:
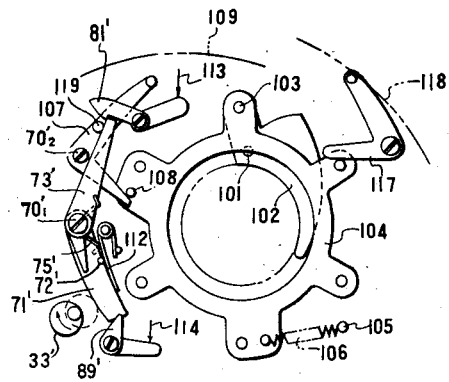
Figure 13:
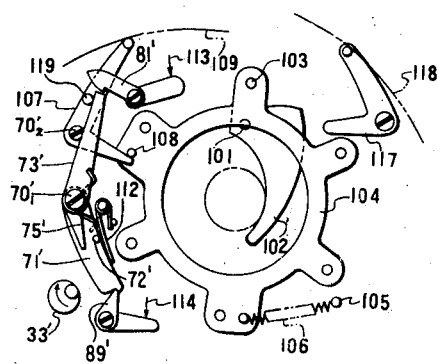
Figure 14:
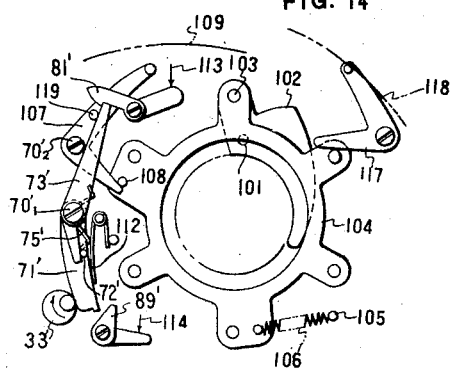

The foregoing, and other, objects and features of the present invention will become more apparent from the description of illustrative embodiments thereof and the drawing forming a part thereof, in which drawing:

FIG. 1 is the plan view of a camera embodying a first illustrative embodiment of the invention with the top partly removed;

FIG. 2, a partial and sectional front view thereof on section line II—II of FIG. 1;

FIG. 2a is a schematic plan view of the film winding gear train;

FIG. 3, a partial section along line III—III of FIG. 2;

FIG. 4, a tangential sectional side view along line IV—IV of FIG. 1, particularly showing the arrangement of the shutter release button and the reflex mirror;

FIG. 5, a partial bottom view of FIG. 2 with the bottom removed;

FIGS. 6 to 8, the successive positions of the elements on actuation of the reflex mirror;

FIG. 9, a perspective simplified view of the preset diaphragm operating mechanism per se;

FIGS. 10 and 11, a view showing the positions occupied by the elements of the operating mechanism of FIG. 9 at different stages of the operation;

FIG. 12, a schematic of a modified embodiment of the diaphragm operating mechanism according to the invention; and FIGS. 13 and 14, views of the positions occupied by the elements of the operating mechanism of FIG. 12 at different stages of its operation.

In the drawing, like reference numerals denote like members throughout. Camera housing 1 has a lens mount 2 into which an objective lens is threaded. Top 3 covers the housing 1 which encloses the various elements of the mechanisms installed in the housing. A roll of film is inserted in the righthand end region of the camera shown in FIG. 1, the film traveling past an exposure aperture at the rear portion of the camera, as is well known, and being wound up onto a take-up spool 5 by means of a lever 4. An indicator window 6 of the film frame counter is provided in top 3 permitting observation of the number of frames of film which have been exposed. A release button 7 is provided in close proximity to lever 4. The shaft of lever 4 is connected to gear 8 and sprocket 12. For rotation of the gears 8 and 10 in the opposite directions, a second idler gear 9' meshes with idler 9 and gear 10, and gear 10 idler 9 rotates gear 11 and consequently rotates sprocket 12 simultaneously with gear 11, thereby advancing precisely one exposure length of the film by way of the film perforations. Gear 8 and sprocket 12 rotate in the same direction, as shown by arrow a, while gear 10, supported on the same shaft as gear 8, freely rotates quite independently of both gear 8 and sprocket 12. For such opposite rotation of gears 8 and 10, another idler gear 9' is provided to mesh with gears 10 and 11, as shown in FIG. 2 and more clearly in FIG. 2A. Further, gear 10 maintains a frictional connection with take-up spool 5 in the prior known manner, thus take-up spool 5 winds the film up in the direction opposite to arrow a by means of gear 9'. Shaft 13 of sprocket 12 is rigidly secured to gear 14 provided on the lower part of sprocket 12. Since shaft 13 is operatively connected to the axial movement of release button 7, when the latter is depressed shaft 13 and gear 14 are likewise depressed drawing gear 14 downward away from sprocket 12. A projection 15 extends downwardly from the bottom face of sprocket 12 while a projection 16 extends upwardly from the upper face of gear 14 so as to provide a clutch means co-operating with projection 15. Shaft 13 and gear 14 are biased upwardly at all times by suitable, prior known, means and only when shutter release button 7 is depressed, does gear 14 move down to release the clutch engagement between projections 15 and 16. Gear 18 is pivotally supported on mechanism plate 17 located at the lower region of the camera body, the mechanism plate also supporting gear 14, take-up spool 5, and other elements. Gear 18 meshes with gear 19 rigidly secured to the first shutter curtain winding roller 20. Gear 21 is secured to the upper region of first shutter curtain winding roller 20 and meshes with gear 22 forming a part of the shutter speed controlling mechanism. Externally of top 3, and coaxial with gear 22, a shutter speed dial 23 is provided to regulate the desired shutter speed, in well known manner, by setting the desired indicating character on shutter speed dial 23 opposite a reference mark 24 on top cover 3. Gear 22' is provided on the shaft of gear 22 and forms part of the shutter speed control mechanisms, which, however, not being within the scope and purpose of the present invention, will not be dealt with herein in detail.

Gear 22' engages gear 21' having the same diameter as gear 21, gear 21' moving as a unit with the second shutter curtain winding roller 20'. Thus, when the film winding lever 4 is actuated, film is wound up by means of sprocket 12, and simultaneously the shutter curtain is wound up through gear train 14, 18 and 19, and gears 22 and 22', forming part of the shutter speed control mechanism, simultaneously rotate through gear 21 provided at the top of first shutter curtain winding roller 20, so that second shutter curtain winding roller 20' is wound with first shutter curtain winding roller 20. When the shutter curtain winding operation is completed, sprocket 12 comes to rest precisely after making one revolution, whereupon all preparation to make an exposure is completed. The above mentioned mechanisms, namely, the shutter mechanism, the film winding mechanism, etc., are similar to those in prior known cameras.

Below mechanism plate 17, at the lower region of the camera body as stated, disk 25 is integral with the shaft to the upper end region of which gear 10 is affixed. A screw pin 26 is eccentrically secured to disk 25 and serves as the pivot of an elongated rod 27 at one end of the rod. The other end of elongated rod 27 is movably affixed by a screw 28 to member 30 having elongated apertures 31, 31, the number 30 being supported slidably longitudinally on mechanism plate 17 by screws 32, 32. Thus, as gear 10 rotates one revolution in each exposure cycle, elongated rod 27 executes a crank motion by the revolution of gear 10, so that member 30 reciprocates along the elongated apertures 31, 31. Projection 33 formed at one end region of member 30 projects upwardly through elongated opening 34 in mechanism plate 17, serving to tension a spring for the automatic controlling system of the iris diaphragm, as will be set forth in detail hereinbelow.

Within camera housing 1, a pair of partition walls enclose the exposure aperture; FIG. 2 illustrating but one partition wall 35 while another partition wall 35' is provided to the diametrically opposite side of the optical axis of the objective. Dividing partition walls 35, 35' support a horizontal shaft 36 on which a reflecting mirror holding frame 38 is swingably pivoted. The reflecting mirror holding frame has anchored thereto one end of a coiled spring 39, wound about shaft 36, the other end of spring 39 being anchored in partition wall 35'. Spring 39 is relatively weak and serves to lower reflecting mirror 37 from its upswung and withdrawn position down into its downswung and intercepting position. A plate spring 40 is affixed to reflecting mirror holding frame 38 at a region in close proximity to horizontal shaft 36 and parallel thereto. Plate spring 40 is riveted to the central region of the reflecting mirror holding frame 38 and at its left end has a bend forming pin 40' projecting toward the partition 35, as illustrated in FIGS. 1 and 6. On partition 35, a driving plate angle lever 41, of relatively large size and having projecting arms 43 and 52, is pivotally supported on pin 42. Another flat lever 44 is also pivoted on pin 42 overlapping the driving plate lever 41. Lever 44 extends upwardly and engages pin 40' of the mirror holding frame 38, with its end portion 45. A shoulder 46 is formed at its lower region to engage a hook 50 formed at one end of lever 48 which is yieldingly pivoted on pin 47 on the driving plate by a spring 51. Arm 52 of the driving plate 41 extends downwardly to project through elongated opening 54 defined in mechanism plate 17 at the lower region of the camera body. The lower end of the arm 52 is bent into the shape of a J, as illustrated at 53 in FIGS 3 to 7 and engages elongated rod 27 which reciprocates under neath mechanism plate 17. On arm 52 of driving plate 41 there is secured a pin 55 to which a spring 57 is hooked, the other end of spring 57 being secured to partition 35, by means of stud 56. Thus spring 57 urges driving plate 41 to turn counterclockwise at all times, as shown in FIG. 6. An arm 43 at the upper region of driving plate 41 has an engaging portion 58 at its upper end to engage hook 59 of latching member 60 which is disengageable by means of release button 7. Latching member 60 is pivoted on screw 61 on partition wall 35 and is so biased by a spring 62 interposed between it and a stud 63 in partition 35 as to engage arm 43. It should be noted that the mechanism between shutter release button 7 and latching member 60 may be designed in any appropriate prior known manner.

In this embodiment, when the shutter release button is depressed, pin 65 extending from rod 66 pushes arm 64 of latching member 60 to impart a clockwise movement to latching member 60 against the tension of spring 62. A lug 49 at the lower end of lever 48 pivoted, as stated, on driving plate 41, is adapted to engage a stud 68 projecting upwardly from gear 67 rotatable with the second shutter curtain as a unit. Gear 67 meshes with gear 19' provided below second shutter curtain roller 20', as shown in FIG. 3. Stud 68 is disengaged from lug 49 of lever 48 when the shutter curtain is completely wound up, such condition being shown in FIG. 3. When shutter release button 7 is depressed, as set forth in detail below, reflecting mirror holding frame 38 first swings up eventually releasing the shutter by means of such movement of the holding frame 38, and second shutter curtain winding roller 20' rotates clockwise. By such rotation of the second shutter curtain winding roller, gear 67 and stud 68 rotate counterclockwise to kick lug 49 and thus, as shown in FIG. 8, hook 50 of lever 48 releases shoulder support 46 of lever 44.

A driving mechanism to control the iris diaphragms of the interchangeable objectives according to this invention is provided on the upper surface of lower mechanism plate 17. As shown in FIGS. 2 and 3, an arm 71 is journalled at one end of shaft 70 and a pin 72 projects backward from the free end of arm 71. Bearings 69 and 69' for shaft 70 are provided on mechanism plate 17 as a unit. An arm 73 is integral with the other end of shaft 70 together with a coupling or connecting member 87 having a coupling groove 88. A backward projecting nose 74 is provided at the free end of arm 73 and is provided thereon to affix one end of a spring 75, the other end of the spring 75 being supported on a stud or a bent portion projecting in the opposite direction of pin 72 of arm 71, as shown in FIG. 9. The arms 71 and 72 are biased by spring 75 to come closer to each other unless otherwise impeded. Close to the lower portion of partition 35 a protuberance 85 extends from the camera housing wall on which, by means of a screw 84, a bell crank 81 is pivoted. One end 82 of bell crank 81 engages nose 74 of arm 73, while the other end 83 of the bell crank maintains contact, under the bias of spring 84' about pivot 84, with a conical member 86 at the lower end of rod 66. The rod 66 is vertically reciprocable in a guide 64 on partition 35 and is biased upwardly in known manner by a spring, not shown. Another bell crank 76 is pivoted on mechanism plate 17 on pivot screw 77 and is biased clockwise by a spring 78 interposed between it and stud 79 of mechanism plate 17. One end 80 of bell crank 76 extends into the path of the swing of the lower end portion of lever 48 pivoted on driving plate 41 and is controlled by stud 68 on gear 67 as well as bent portion 49. Pin 72 of arm 71 swings about shaft 70 maintaining a relatively short distance from mechanism plate 17 so as to be engagable with projection 33 projecting upwardly above the mechanism plate from member 30 to tension spring 75 on winding up the film. As shown in FIGS. 2 and 3, arm 73 passes upward over cam 82' at the end of bell crank 82 against the force of spring 84' about pivot shaft 84 by means of coupling member 87. Coupling member 87 is normally urged counterclockwise, in FIG. 2, by means of an iris-diaphragm driving spring within the lens barrel, as set forth in detail hereinafter, see spring 116, FIGURE 9. When film is wound, projection 33 shifts to the right (FIG. 3) to swing pin 72 of arm 71 to the right. Pin 72 swings bell crank 76 counterclockwise against the force of spring 78 by engaging the inclined surface region of bell crank 76 and engages with bell crank 76 after passing beyond latch 89 thereon, which tensions spring 75 to urge arm 73 counterclockwise in FIG. 2. Tensioned arm 73 is maintained latched by one end of bell crank 81. When release button 7 is depressed, conical member 86 at the bottom of rod 66 pushes arm 83 of bell crank 81 and disengages the other arm 82 of bell crank 81 from arm 73. Thus, arm 73 turns counterclockwise under the force of spring 75 and, in company therewith, coupling member 87 likewise rotates with arm 73 as a unit.

Referring to the iris diaphragm controlling system of the invention shown in FIGURES 9 to 11, inside the tubular barrel of the camera objective, a plurality of stub shafts 101 is concentrically disposed on each of which a diaphragm blade 102 is pivoted; only two blades being shown to simplify the drawing. An end portion of each diaphragm blade 102 engages an individual one of a plurality of pins 103 of a diaphragm actuating ring 104 and thus the blades 102 are operable by oscillation of ring 104 about the optical axis of the objective. A spring 106 is tensioned between diaphragm actuating ring 104 and a pin 105 affixed to the tubular barrel of the objective so as to bias the diaphragm blades 102 into full open position at all times. A rotatable shaft 70' is journalled inside the tubular lens barrel and an angle lever 107 is rigidly secured to shaft 70', the free end of one arm of lever 107 engaging pin 108 on diaphragm actuating ring 104 while the free end of the other arm of lever 107 is pressable against a regulating cam 109 rotatably provided on the tubular lens barrel to control the preset diaphragm. Thus when shaft 70' rotates in the direction of the arrow shown in FIG. 9, the one arm of the lever 107 urges diaphragm actuating ring 104 to rotate counterclockwise to such position that the other arm of lever 107 engages cam 109 so that diaphragm blades 102 are stopped down or closed to an appropriate aperture. A first arm 71 is journalled on shaft 70 within the camera body and aligned with shaft 70' while a second arm 73 is rigidly affixed to shaft 70. Between the arms 71 and 73 an actuating spring 75 is tensioned. Bell crank 81 is pivoted on the camera body to engage and latch lever 73 at the free end region thereof, while projection 33, or any other suitable means such as a cam, is provided to tension the spring 75 by oscillatory motion when winding the film or tensioning the shutter. Bell crank 76 is provided in the path of the swing of first arm 71 to engage the first arm when the first arm is in its fully tensioned position. A weak spring 112, which is shown only in FIGURES 10 and 11, bears against arm 71 in such direction as to bias it counterclockwise. Bell crank 81, pivoted on the camera housing, releases lever 73 when release button 7 is depressed. Stud 68 on gear 67 engages with one arm 80 of bell crank 76 to release lever 71 when the second shutter curtain is closed after an exposure has been made. Since such mechanisms coupling bell cranks 76 and 81 with the reflex mirror and the shutter are no part of the instant invention, they are not here described in detail. Provision of a coupling member 87' having a diametrical projection 88' to engage groove 88 of coupling member 87 of shaft 70, at the camera inward end of shaft 70' is preferable when the automatic iris diaphragm device is applied to interchangeable camera objectives, it being also preferable to provide a telescoping portion 115 at an intermediate region of shaft 70' to permit axial movement of objective lens barrel without uncoupling shaft 70' from shaft 70. It will be noted that spring 116, encircling shaft 70', biases shaft 70' in the counterclockwise direction. In FIGS. 10 and 11, levers 71 and 73, and bell cranks 76 and 81, are shown in modified forms for the sake of simpler illustration, and are denoted by the corresponding primed numerals. Their operation being readily understood in such modified form, it is not here described.

Referring to FIGS. 12 to 14 showing still another embodiment of the invention, a V-shaped lever 107 is secured to a shaft $70'_2$ which is quite independent of shaft $70'_1$ on which second arm 73' is affixed. A pin 119 is affixed to one arm of lever 107 and engages with the free end of second arm 73'. First arm 71' and second arm 73' are both journalled on shaft $70'_1$.

Having above described the construction of the iris diaphragm automatic operating system, the mode of operation of reflex cameras incorporating the invention will now be set forth in detail. To make an exposure subsequent to a prior exposure, lever 4 is turned in the direction of arrow $a$ in FIG. 1, sprocket 12 feeds a required length of film by means of gear train 8, 9 and 11, and take-up spool 5 winds up the exposed portion of the film by means of gears 8, 9, 9', 10 and others. The shaft of take-up spool 5 makes just one revolution, and elongated rod 27 moves pin 72 to engage with latch 89, as shown in FIG. 3. As best shown in FIG. 5, the movement of elongated rod 27 also pushes J-shaped end region 53 of arm 52 of driving plate 41 against the force of spring 57. Driving plate 41 is now latched at the position shown in FIG. 6, spring 57 being tensioned and plate 41 being latched through latch 59 and arm 43. Rod makes one cyclic movement and stops at the position shown in FIG. 5. In so doing, projection 33 presses against lever 71 and the latter is swung clockwise. The lever 71 is latched by latching lever 89 and spring 75 is tensioned. Now the photographer views an image through eyepiece 90 (FIG. 4), a pentagonal prism above the ground glass 91, the ground glass, the reflex mirror 37, and the objective lens in the camera. Release button 7 is depressed to make an exposure after the usual control of exposure and focusing, thereby lowering rod 66 (FIG. 7). Driving plate 41 is released from latching member 60 and turns counterclockwise under the tension of spring 57. Since hook portion 50 of lever 48, on driving plate 41, pulls shoulder 46 of lever 44 downward, free end 45 of lever 44 pushes pin 40' and consequently reflecting mirror holding frame 38 swings up about horizontal shaft 36. A bell crank 94 having pin 92 is pivoted on partition 35 at 93, FIGS. 1 and 4, and the marginal portion of reflecting mirror holding frame 38 kicks pin 92 upwardly to swing bell crank 94 clockwise when mirror 37 swings up. One arm 95 of bell crank 94 engages the right end of lever 96 which is pivoted on camera housing 1 by means of screw 97 (FIG. 1). Thus, on swinging of the reflex mirror 37 upwardly, lever 96 is turned counterclockwise against the force of spring 99, affixed to lever 96. The left end 98 of lever 96 disengages from projection 100 on gear 22'. Gear 22' is a member of the shutter speed controlling mechanism and projection 100 and lever 96 comprise parts of the shutter release mechanism. When lever 96 releases gear 22', the shutter runs down in well known manner. Prior to the running down movement of the shutter curtain, bell crank 81 turns counterclockwise by the lowering movement of conical nib 86 on the end of rod 66. Now arm 82 of bell crank 81 releases arm 73 and turns counterclockwise by the force of spring 75 to turn coupling member 87 therewith.

The operation of the preset iris diaphragm controlling system shown in FIGS. 9 through 11 of the first embodiment, is as follows. Preset cam 109 is first set at the desired objective lens opening by registering the F number on the ring and a fixed reference on the barrel. Then the shutter is wound up and first arm 71 is turned in the direction of the arrow, FIG. 9, by means of projection 33, and eventually engages bell crank 76 to tension actuating spring 75, of which the ends are anchored respectively in arm 71 and arm 73. When the shutter release button is now depressed, the reflex mirror 37 swings up to the retracted or withdrawn position and at the same time bell crank 81 releases second arm 73 by means of conical member 86. Spring 75 now turns shaft 70' through the coupling 87, 87', against the bias of spring 116, whereby lever 107, itself rotating clockwise until the other arm thereof engages with cam 109 of the preset ring, rotates the diaphragm actuating ring 104 counterclockwise to position the diaphragm blades 102 at the predetermined objective lens opening. Subsequently the shutter operates to make the exposure, and toward termination of the run down of the second curtain, bell crank 76 releases first arm 71 by means of stud 68 on gear 67 of the second shutter curtain. First arm 71, being now free of the tension of spring 75, turns counterclockwise under the tension of a weak spring to bias lever 71 counterclockwise (FIGURE 9), not shown in the drawing. Now shaft 70' is rotated counterclockwise by springs 106 and 116 and the second arm 73 is engaged by latch 89, opening the blades 102 to full open position of the diaphragm. A V-shaped pivoted lever 117 is provided to stop down the diaphragm blades 102 to a desired smaller aperture while focusing the objective to observe the effect of stopping down. The more cam 118 rotates counterclockwise, the move V-shaped lever 117 turns clockwise and the smaller will be the diaphragm opening which is obtained.

The operation of the modified embodiment of the iris diaphragm automatic operating system of the invention shown in FIGS. 12 through 14, is as follows: The film and shutter are wound to make an exposure just as in the first embodiment. Simultaneously cam 33' is rotated to swing first arm 71' to be latched by latching lever 76'. This deflection of arm 71' tensions spring 75' as also weaker spring 112, and cam 33' clears arm 71' as shown in FIG. 12. When release button 7 is now depressed, reflex mirror 37 swings up and releases second arm 73' from latching lever 81'. The free end of arm 73' pushing against pin 119 rotates V-shaped lever 107 about pivot 70'$_2$. The spring 75' is stronger than spring 106 biasing the diaphragm actuating ring, so that lever 107 now rotates diaphragm actuating ring 104 clockwise by way of pin 108 on ring 104. Lever 107 continues to turn clockwise until its upper free end engages the inner peripheral surface of preset cam 109. Thus the lens aperture is stopped down to the predetermined aperture selected by preset cam 109, and, after such operation, the shutter runs its course to make the exposure. When the second curtain shutter covers the exposure aperture, stud 68 on gear 67 kicks lower end 49 of lever 48 and disengages hook 50 from shoulder 46 to swing the reflex mirror down into the intercepting position. On the other hand, lever 114 is lowered by this same stud 68, or by the down swing of the reflex mirror, and latching lever 89' releases first arm 71' (FIG. 14). First arm 71' rotates under the tension of weak spring 112, and pin 72' thereon engages the small extending arm of second arm 73' to rotate second arm 73' clockwise until its free end is engaged with latch 81'. Now pin 119 of V-shaped lever 107 is free to move and rotate lever 107 upper arm clockwise so that its lower arm engaging pin 108 rotates diaphragm actuating ring 104 counterclockise by the tension spring 106 to open the diaphragm blades 102 to the fully open aperture position of the objective. To make the next exposure, the film and the shutter are again wound and cam 33' makes one rotation, and the operation of the device is repeated as above described.

It should be particularly noted that the preset diaphragm opens to its full open aperture as soon as an exposure has been made in the automatic control system of my invention. Such actuation of the diaphragm enables seeing the subject immediately after an exposure is made when, as here, such feature is combined with a quick-return reflex mirror. This operation of the diaphragm vastly improves the performance of reflex cameras over that of the prior art reflex cameras which, at most, enable seeing but a dark view through the stopped down ends aperture which, by my invention, is all changed to give a perfectly bright view through the fully open lens aperture.

What is claimed is:

1. In a reflex camera having a reflex mirror swingably mounted within its body behind the objective and swingable to an inoperative position, and a film winding mechanism, the combination with an automatic iris diaphragm within the camera objective and controlled by an oscillatory rotatable shaft, of a first arm pivotally supported on the diaphragm control shaft, a second arm integrally on the diaphragm control shaft adjacent to the first arm, an actuating drive spring braced between the first and second arms, an oscillatable means to tension the actuating drive spring upon winding the film, a lever coupling the second arm to a diaphragm actuating ring to move it to a predetermined aperture by the tension of the actuating spring, a cam adjustable in the path of the coupling lever to predetermine the diaphragm opening, a first latch adapted to engage the first arm when such arm is swung to tension the actuating spring, a second latch adapted to engage the second arm upon tensioning the actuating spring, a first releasing means actuable by the depression of the release button to release the second latch, a second releasing means responsive to closure of the shutter after an exposure is made to release the first latch, and a diaphragm opening spring moving the diaphragm actuating ring in a predetermined direction automatically to open the diaphragm to its full open aperture immediately upon having made an exposure to permit the viewing of a very bright image of the object to be photographed through the mirror in its operative position and the fully opened diaphragm.

2. The combination according to claim 1 in which a coupling means is provided on the diaphragm actuating shaft to couple such shaft with interchangeable objectives.

3. The combination according to claim 2 in which the coupling between the diaphragm actuating shaft and the objective is telescopic.

4. The combination of claim 1 in which the second latch is a pivoted angle lever which is so spring biased that one end is engaged to the second arm on tensioning the diaphragm actuating spring, and the first releasing means is an axially displaceable rod operable by the release button having a conical end region engaging with the other end region of the angle lever and on depression displacing the angle lever against its spring bias to disengage the second arm.

5. In a reflex camera having a reflex mirror normally positioned in the viewing position behind the objective and swingable to an inoperative upswung position only when the shutter runs down to make an exposure, and a film winding mechanism, the combination with an automatic iris diaphragm incorporated in the objective of the camera body, of a first arm pivotally supported on a pivot within the body, a second arm pivoted to such pivot coaxially with the first arm, a diaphragm actuating spring braced between the first and second arms, an elongated rod connected to the film winding mechanism and executing a crank motion when the film winding mechanism is wound up, an oscillatable means connected to the elongated rod to tension the actuating spring by swinging the first arm upon actuating the film winding mechanism, a V-shaped lever connecting the second arm with the diaphragm actuating ring to close the diaphragm blades to a predetermined aperture by the actuating spring, a first latch to engage the first arm when the first arm is swung to tension the actuating spring, a second latch to engage the second arm in a predetermined position, a first releasing means to release the second latch coupling on the depression of the release button, a second releasing means to release the first latch by the closure of the shutter, and a diaphragm opening spring less powerful than the diaphragm actuating spring automatically to open the diaphragm to its full open aperture after an exposure is made; the diaphragm actuating spring being tensioned by the reciprocating motion of the oscillatable means and maintaining its tensioned condition by the latching of the first latch, a driving plate to move the mirror upwardly, depression of the release button releasing the driving plate for the reflex mirror to cause the mirror to swing upward and also releasing the latching engagement of the second latch prior to the shutter opening, the diaphragm being closed to a predetermined aperture by the swing of the second arm due to the tension of the actuating spring, the second releasing means releasing the first latch when the shutter is completely closed, and the diaphragm reopening to its full open aperture by the tension of the diaphragm opening spring so as to make visible the object on the ground glass of the camera in the brightest condition except while the shutter is running down while making an exposure.

References Cited in the file of this patent

UNITED STATES PATENTS

| | | |
|---|---|---|
| 2,503,777 | Stoiber | Apr. 11, 1950 |
| 2,730,025 | Faulhaber | Jan. 10, 1956 |
| 2,803,182 | Werner | Aug. 20, 1957 |
| 2,805,610 | Haupt | Sept. 10, 1957 |
| 2,931,072 | Yoshida | Apr. 5, 1960 |